(12) United States Patent
Ishigaki et al.

(10) Patent No.: US 7,981,558 B2
(45) Date of Patent: Jul. 19, 2011

(54) FUEL CELL SYSTEM (75) Inventors: Katsuki Ishigaki, Handa (JP); Hideaki Mizuno, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 205 days.

(21) Appl. No.: 12/373,828

(22) PCT Filed: Jun. 5, 2007

(86) PCT No.: PCT/JP2007/061687
§ 371 (c)(1),
(2), (4) Date: Jan. 14, 2009

(87) PCT Pub. No.: WO2008/018229
PCT Pub. Date: Feb. 14, 2008

(65) Prior Publication Data
US 2010/0015484 A1 Jan. 21, 2010

(30) Foreign Application Priority Data

Aug. 11, 2006 (JP) ................................. 2006-220140

(51) Int. Cl.
*H01M 8/04* (2006.01)
(52) U.S. Cl. .................. 429/444; 429/429; 429/446
(58) Field of Classification Search ................ 429/25, 429/23, 13, 34, 429, 432, 442, 415, 444, 429/513
See application file for complete search history.

(56) References Cited

U.S. PATENT DOCUMENTS

| | | | | |
|---|---|---|---|---|
| 2002/0048698 | A1* | 4/2002 | Fronk | 429/19 |
| 2002/0192519 | A1* | 12/2002 | Fujita et al. | 429/23 |
| 2004/0229088 | A1* | 11/2004 | Hayashi et al. | 429/13 |
| 2006/0088742 | A1* | 4/2006 | Kotani et al. | 429/13 |
| 2007/0196709 | A1* | 8/2007 | Umayahara et al. | 429/25 |
| 2007/0224473 | A1* | 9/2007 | Suematsu et al. | 429/25 |

FOREIGN PATENT DOCUMENTS

| | | | |
|---|---|---|---|
| JP | 2003-173807 | A | 6/2003 |
| JP | 2004-179000 | A | 6/2004 |
| JP | 2004-179149 | A | 6/2004 |
| JP | 2004-342385 | A | 12/2004 |
| JP | 2005-141977 | A | 6/2005 |
| JP | 2005-302708 | A | 10/2005 |
| JP | 2006179469 | A * | 7/2006 |

* cited by examiner

*Primary Examiner* — Jonathan Crepeau
*Assistant Examiner* — Kenneth Douyette
(74) *Attorney, Agent, or Firm* — Kenyon & Kenyon LLP (57) ABSTRACT

A fuel cell system comprises a fuel cell, a supply flow passage for flowing a fuel gas supplied from a fuel supply source to the fuel cell, a variable gas supply device for regulating the state of the gas on the upstream side of the supply flow passage to supply the gas to the downstream side, a discharge flow passage for flowing a fuel off gas discharged from the fuel cell, a discharge valve for discharging the gas from the discharge flow passage to the exterior, and a control part for closing the discharge valve when the discharge amount of the gas calculated while the discharge valve is opened exceeds a predetermined target discharge amount. The control part stops the gas supply from the variable gas supply device and simultaneously closes the discharge valve, when the discharge amount of the gas calculated while the discharge valve is opened exceeds the target discharge amount.

8 Claims, 9 Drawing Sheets

//<sub>(2)</sub>

FUEL CELL SYSTEM

This is a 371 national phase application of PCT/JP2007/061687 filed 05 Jun. 2007, which claims priority to Japanese Patent Application No. 2006-220140 filed 11 Aug. 2006, the contents of which are incorporated herein by reference.

TECHNICAL FIELD

The present invention relates to a fuel cell system.

BACKGROUND ART

Heretofore, a fuel cell system including a fuel cell for receiving the supply of a reactant gas (a fuel gas and an oxidizing gas) to generate a power has been suggested and put to practical use. When the power is generated, impurities such as nitrogen and carbon monoxide are accumulated in the fuel cell of the fuel cell system and a circulation passage of a fuel off gas with an elapse of time. To discharge such impurities from the system, a technology (a purge technology) is suggested in which a gas discharge valve is provided in a discharge flow passage connected to the circulation passage, and the opening/closing of the gas discharge valve is performed to discharge the gas from the circulation passage after each predetermined time.

Moreover, at present, there have been suggested a technology (Japanese Patent Application Laid-Open No. 2004-179000) for performing control so as to close the gas discharge valve in a case where the flow rate of the gas flowing through the gas discharge valve exceeds a predetermined value and a technology (Japanese Patent Application Laid-Open No. 2005-141977) for setting discharge time in accordance with the power generation state of the fuel cell to realize the discharge of the gas of a discharge amount equal to a required discharge amount corresponding to the power generation state.

DISCLOSURE OF THE INVENTION

A fuel cell system is provided with a fuel supply flow passage for flowing a fuel gas supplied from a fuel supply source such as a hydrogen tank to a fuel cell.

Moreover, at present, a technology has been suggested in which this fuel supply flow passage is provided with a variable gas supply device such as a mechanical variable regulator to change the supply pressure of the fuel gas from the fuel supply source in accordance with the operation state of the system.

Moreover, in recent years, a technology has been suggested in which an injector is employed as the variable gas supply device and in which a purge amount (a gas discharge amount) from the gas discharge valve is calculated based on the gas supply from the injector to close the gas discharge valve in a case where the calculated purge amount exceeds a predetermined threshold value (a target purge amount) (hereinafter referred to as "the injector gas discharge control"). In the conventional injector gas discharge control, as shown in FIGS. 9A and 9B, a gas discharge amount increment corresponding to the gas supply from the injector at a certain time is calculated, this gas discharge amount increment is added to a purged amount at that time to calculate the total purge amount, and the discharge valve is closed in a case where this total purge amount exceeds the target purge amount.

Figure 9A:
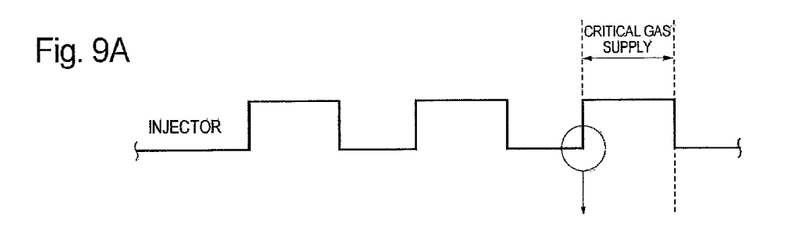
FIG. 9A is a time chart (showing the opening/closing operation of an injector) for explaining the purge control of a conventional fuel cell system.
Figure 9B:
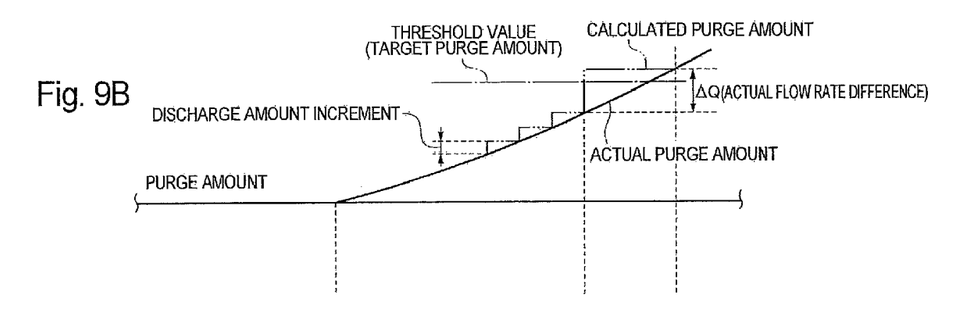
FIG. 9B is a time chart (showing a calculated purge amount and an actual purge amount) for explaining the purge control of the conventional fuel cell system.
Figure 9C:
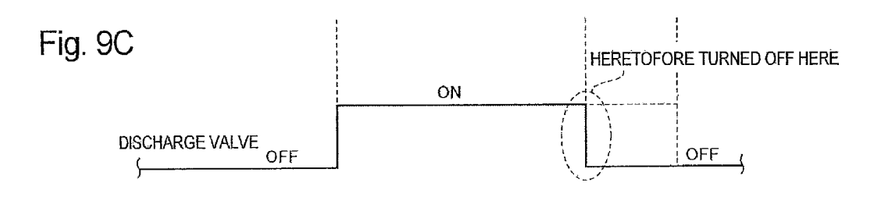
FIG. 9C is a time chart (showing the opening/closing operation of a gas/water discharge valve) for explaining the purge control of the conventional fuel cell system.

However, when such conventional injector gas discharge control is employed, as shown in FIGS. 9A and 9C, the gas discharge valve is closed at the start of the gas supply (critical gas supply) from the injector in a case where the calculated purge amount exceeds the target purge amount. In consequence, a gas discharge amount increment ΔQ in a case where the calculated purge amount exceeds the target purge amount is not discharged, which results in a problem that an actual gas discharge amount is below the target gas discharge amount (a gas discharge error is generated) as shown in FIG. 9B.

The present invention has been developed in view of such a situation, and an object thereof is to suppress a gas discharge error in a fuel cell system including a variable gas supply device and a discharge valve and configured to close the discharge valve in a case where the calculated discharge amount exceeds a predetermined target discharge amount.

To achieve the object, a first fuel cell system according to the present invention comprises a fuel cell; a supply flow passage for flowing a fuel gas supplied from a fuel supply source to the fuel cell; a variable gas supply device which regulates the state of the gas on the upstream side of this supply flow passage to supply the gas to the downstream side; a discharge flow passage which flows a fuel off gas discharged from the fuel cell; a discharge valve which discharges the gas from the discharge flow passage to the exterior; and control means for closing the discharge valve in a case where the discharge amount of the gas calculated while the discharge valve is opened exceeds a predetermined target discharge amount, the control means being configured to close the discharge valve simultaneously with the stop of the gas supply from the variable gas supply device, in a case where the discharge amount of the gas calculated while the discharge valve is opened exceeds the target discharge amount.

In a case where such a constitution is employed and the discharge amount calculated while the discharge valve is opened exceeds the predetermined target discharge amount, the discharge valve can be closed simultaneously with the stop of the gas supply. In other words, in a case where the discharge amount calculated while the discharge valve is opened exceeds the predetermined target discharge amount, the opening of the discharge valve can be continued in consideration of the gas supply. Therefore, it is possible to prevent the actual discharge amount from being below the target discharge amount (a discharge error) owing to the gas supply from the variable gas supply device. It is to be noted that "the gas state" is the state of the gas represented by a flow rate, a pressure, a temperature, a mol concentration or the like, and in particular, at least one of the gas flow rate and the gas pressure is included.

Moreover, a second fuel cell system according to the present invention comprises a fuel cell; a supply flow passage for flowing a fuel gas supplied from a fuel supply source to the fuel cell; a variable gas supply device which regulates the state of the gas on the upstream side of this supply flow passage to supply the gas to the downstream side; a discharge flow passage which flows a fuel off gas discharged from the fuel cell; a discharge valve which discharges the gas from the discharge flow passage to the exterior; and control means for closing the discharge valve in a case where the discharge amount of the gas calculated while the discharge valve is opened exceeds a predetermined target discharge amount, the control means being configured to calculate a required time from a time when the gas supply from the variable gas supply device is started to a time when the discharge amount calculated by adding at least a part of a discharge amount increment corresponding to the gas supply to a discharged amount at that time reaches the target discharge amount, in a case where the discharge amount calculated while the discharge valve is opened exceeds the target discharge amount, and being configured to close the discharge valve after the elapse of the required time from the start of the gas supply.

In a case where such a constitution is employed and the discharge amount calculated while the discharge valve is opened exceeds the predetermined target discharge amount, it is possible to calculate the required time from the time when the gas supply from the variable gas supply device is started to the time when the discharge amount calculated by adding at least a part of the discharge amount increment corresponding to the gas supply to the discharged amount at that time reaches the target discharge amount. Moreover, the discharge valve can be closed after the elapse of the predetermined time from the start of the gas supply from the variable gas supply device. Consequently, in a case where the discharge valve is closed simultaneously with the stop of the gas supply from the variable gas supply device and then the actual discharge amount exceeds the target discharge amount, the discharge valve can be closed before the stop of the gas supply. In consequence, it is possible to prevent the actual discharge amount from being above the target discharge amount (the discharge error).

In the above fuel cell systems, it is possible to employ the control means having discharge amount calculation means for calculating the discharge amount from the discharge valve based on the integration of the change of the gas supply state of the variable gas supply device with an elapse of time. In such a case, it is possible to employ the discharge amount calculation means for adding up a pressure change corresponding flow rate converted from the change of the downstream pressure of the variable gas supply device, and the integrated value of a gas correction supply flow rate for compensating for the decrease of the downstream pressure of the variable gas supply device with the elapse of time, to calculate the discharge amount from the discharge valve.

Moreover, in the fuel cell system, an injector may be employed as the variable gas supply device.

The injector is an electromagnetic driving type opening/closing valve in which a valve body can directly be driven with an electromagnetic driving force in a predetermined driving period and detached from a valve seat to regulate the gas state (the gas flow rate or the gas pressure). A predetermined control part can drive the valve body of the injector and control the jet timing or jet time of the fuel gas to control the flow rate or pressure of the fuel gas.

According to the present invention, in the fuel cell system including the variable gas supply device and the discharge valve and configured to close the discharge valve in a case where the calculated discharge amount exceeds the predetermined target discharge amount, the discharge error can be suppressed.

BEST MODE FOR CARRYING OUT THE INVENTION

A fuel cell system 1 according to an embodiment of the present invention will hereinafter be described with reference to the drawings. In the present embodiment, an example in which the present invention is applied to a car-mounted power generation system of a fuel cell vehicle will be described.

Figure 1:
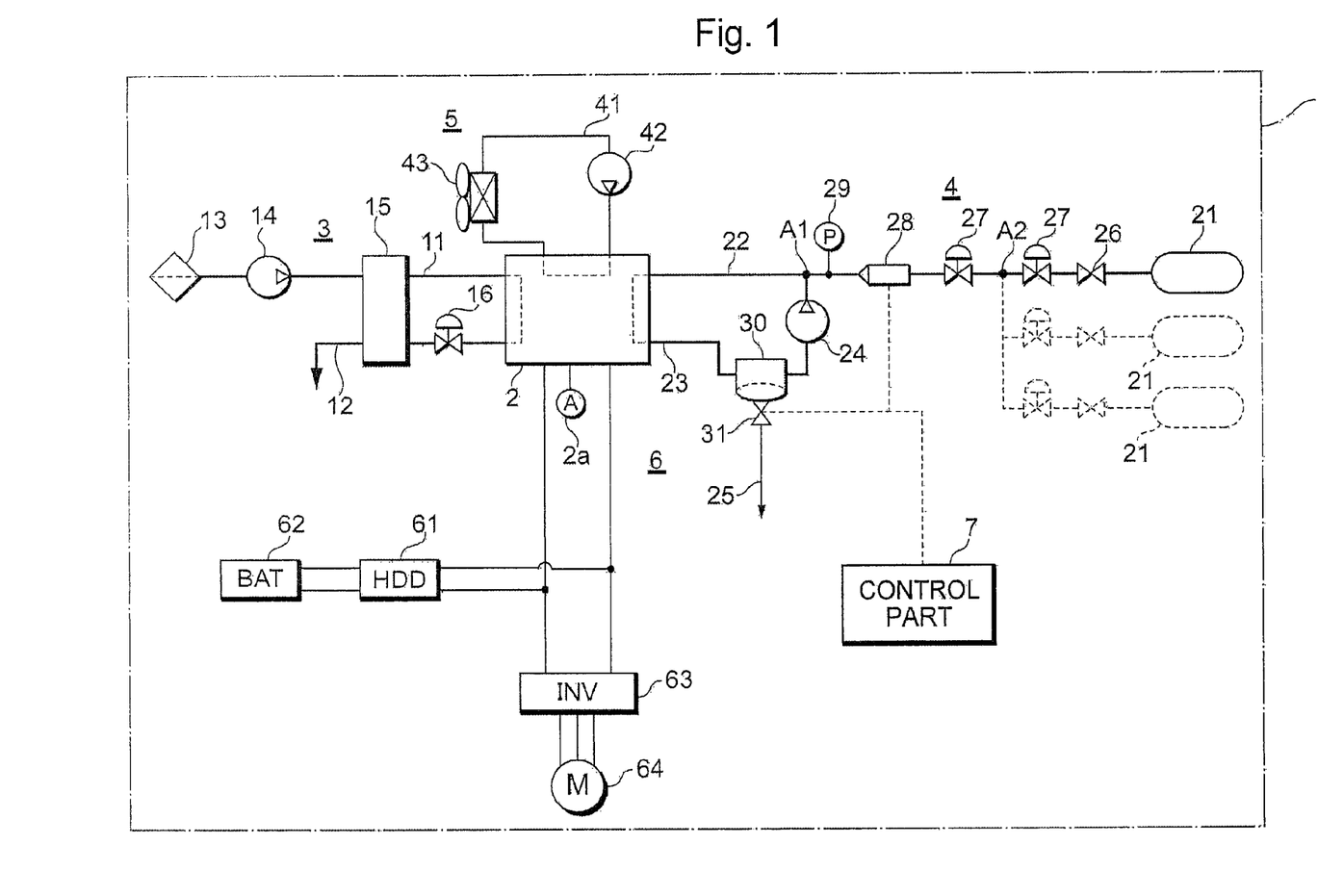
FIG. 1 is a constitution diagram of a fuel cell system according to an embodiment of the present invention.

First, a constitution of the fuel cell system 1 according to the embodiment of the present invention will be described with reference to FIGS. 1 and 2. As shown in FIG. 1, the fuel cell system 1 according to the present embodiment includes a fuel cell 2 which receives the supply of a reactant gas (an oxidizing gas and a fuel gas) to generate a power; an oxidizing gas piping system 3 which supplies air as the oxidizing gas to the fuel cell 2; a fuel gas piping system 4 which supplies a hydrogen gas as the fuel gas to the fuel cell 2; a refrigerant piping system 5 which supplies a refrigerant to the fuel cell 2 to cool the fuel cell 2; a power system 6 which supplies or discharges the power of the system; and a control part 7 which generally controls the whole system.

The fuel cell 2 has a stack structure which is constituted of, for example, a solid polymer electrolytic type and in which a large number of unitary cells are laminated. The unitary cell of the fuel cell 2 has an air pole on one surface of an electrolyte constituted of an ion exchange film and a fuel pole on the other surface, and further has a pair of separators so as to hold the air pole and the fuel pole from opposite sides. The fuel gas is supplied to the fuel gas passage of one separator, and the oxidizing gas is supplied to the oxidizing gas passage of the other separator. When these gases are supplied, the fuel cell 2 generates the power. A current sensor 2a which detects a current during the power generation is attached to the fuel cell 2.

The oxidizing gas piping system 3 includes an air supply flow passage 11 through which the oxidizing gas to be supplied to the fuel cell 2 flows, and a gas discharge flow passage 12 through which an oxidizing off gas discharged from the fuel cell 2 flows. The air supply flow passage 11 is provided with a compressor 14 which takes the oxidizing gas via a filter 13, and a humidifier 15 which humidifies the oxidizing gas fed under pressure by the compressor 14. The oxidizing off gas which flows through the gas discharge flow passage 12 flows through a back pressure adjustment valve 16, is used in water content exchange in the humidifier 15, and is finally discharged as an exhaust gas to the atmosphere outside the system. The compressor 14 is driven by a motor (not shown) to take the oxidizing gas from the atmosphere.

The fuel gas piping system 4 has a hydrogen supply source 21; a hydrogen supply flow passage 22 through which the hydrogen gas to be supplied from the hydrogen supply source 21 to the fuel cell 2 flows; a circulation passage 23 for returning, to a joining part A1 of the hydrogen supply flow passage 22, a hydrogen off gas (a fuel off gas) discharged from the fuel cell 2; a hydrogen pump 24 which feeds, to the hydrogen supply flow passage 22, the hydrogen off gas under pressure in the circulation passage 23; and a gas/water discharge flow passage 25 branched and connected to the circulation passage 23.

The hydrogen supply source 21 corresponds to a fuel supply source according to the present invention, is constituted of, for example, a high-pressure tank, a hydrogen occluded alloy or the like, and can be constituted so as to receive the hydrogen gas of, for example, 35 MPa or 70 MPa. When a shut valve 26 described later is opened, the hydrogen gas flows from the hydrogen supply source 21 to the hydrogen supply flow passage 22. The pressure of the hydrogen gas is finally reduced to, for example, about 200 kPa by a regulator 27 and an injector 28 described later, and the gas is supplied to the fuel cell 2. It is to be noted that the hydrogen supply source 21 may be constituted of a reformer which forms a hydrogen-rich reformed gas from a hydrocarbon-based fuel, and a high-pressure gas tank which brings the reformed gas formed by this reformer into a high-pressure state to accumulate the pressure. Alternatively, a tank having the hydrogen occluded alloy may be employed as the fuel supply source 21.

The hydrogen supply flow passage 22 is provided with the shut valve 26 which blocks or allows the supply of the hydrogen gas from the hydrogen supply source 21, the regulator 27 which regulates the pressure of the hydrogen gas, and the injector 28. On the downstream side of the injector 28 and on the upstream side of the joining part A1 between the hydrogen supply flow passage 22 and the circulation passage 23, a pressure sensor 29 which detects the pressure of the hydrogen gas in the hydrogen supply flow passage 22 is provided. Furthermore, on the upstream side of the injector 28, there are provided a pressure sensor and a temperature sensor (not shown) which detect the pressure and the temperature of the hydrogen gas in the hydrogen supply flow passage 22. Information on the gas state (a pressure, a temperature) of the hydrogen gas detected by the pressure sensor 29 or the like is used in the feedback control or purge control of the injector 28 described later.

The regulator 27 is a device which adjusts the upstream pressure (the primary pressure) of the regulator into a preset secondary pressure. In the present embodiment, a mechanical pressure reduction valve which reduces the primary pressure is employed as the regulator 27. As the constitution of the mechanical pressure reduction valve, a known constitution may be employed which has a housing provided with a back pressure chamber and a pressure adjustment chamber formed via a diaphragm and in which the primary pressure is reduced into a predetermined pressure owing to the back pressure of the back pressure chamber to form the secondary pressure in the pressure adjustment chamber. In the present embodiment, as shown in FIG. 1, two regulators 27 are arranged on the upstream side of the injector 28, whereby the upstream pressure of the injector 28 can effectively be reduced. Therefore, the degree of freedom in design of the mechanical structure (a valve body, a housing, a passage, a driving device and the like) of the injector 28 can be raised. Moreover, the upstream pressure of the injector 28 can be reduced, so that it is possible to suppress a problem that the valve body of the injector 28 does not easily move owing to the increase of a pressure difference between the upstream pressure of the injector 28 and the downstream pressure thereof. Therefore, the variable pressure adjustment width of the downstream pressure of the injector 28 can be broadened, and the lowering of the response property of the injector 28 can be suppressed. The regulator 27 adjusts the gas state (the gas pressure) on the upstream side of the hydrogen supply flow passage 22 to supply the gas to a downstream side, and corresponds to a variable gas supply device according to the present invention.

The injector 28 is an electromagnetic driving type opening/closing valve in which the valve body is directly driven with an electromagnetic driving force in a predetermined driving period and detached from a valve seat, whereby the gas flow rate or the gas pressure can be adjusted. The injector 28 includes the valve seat having a jet hole which jets a gas fuel such as the hydrogen gas, and also includes a nozzle body which supplies and guides the gas fuel to the jet hole, and the valve body movably received and held in an axial direction (a gas flow direction) with respect to this nozzle body to open and close the jet hole. In the present embodiment, the valve body of the injector 28 is driven by a solenoid which is an electromagnetic driving device, and a pulse-like excitation current supplied to this solenoid can be turned on or off to switch the opening area of the jet hole in two stages or multiple stages. The gas jet time and the gas jet timing of the injector 28 are controlled based on a control signal output from the control device 7, whereby the flow rate and the pressure of the hydrogen gas are precisely controlled. In the injector 28, the valve (the valve body and the valve seat) is directly driven with the electromagnetic driving force to open or close, and the driving period of the valve can be controlled into a highly responsive region, so that the injector has a high response property.

In the injector 28, to supply the gas with a demanded flow rate to the downstream side of the injector, at least one of the opening area (the open degree) and the opening time of the valve body provided in the gas passage of the injector 28 is changed, whereby the flow rate (or the hydrogen mol concentration) of the gas to be supplied to the downstream side (a fuel cell 2 side) is adjusted. It is to be noted that the valve body of the injector 28 is opened or closed to adjust the gas flow rate, and the pressure of the gas to be supplied to the downstream side of the injector 28 is reduced as compared with the gas pressure on the upstream side of the injector 28, so that the injector 28 can be interpreted as a pressure adjustment valve (a pressure reduction valve, a regulator). Moreover, in the present embodiment, the injector 28 can be interpreted as a variable pressure adjustment valve capable of changing the adjustment amount (the reduction amount) of the upstream gas pressure of the injector 28 so that the pressure meets a demanded pressure in a predetermined pressure range based on a gas demand. The injector 28 adjusts a gas state (a gas flow rate, a hydrogen mol concentration or a gas pressure) on the upstream side of the hydrogen supply flow passage 22 to supply the gas to the downstream side, and corresponds to the variable gas supply device according to the present invention.

It is to be noted that in the present embodiment, as shown in FIG. 1, the injector 28 is arranged on the upstream side of the joining part A1 between the hydrogen supply flow passage 22 and the circulation passage 23. Moreover, as shown by broken lines in FIG. 1, in a case where a plurality of hydrogen supply sources 21 are employed as fuel supply sources, the injector 28 is arranged on the downstream side of a part (a hydrogen gas joining part A2) in which the hydrogen gases supplied from the hydrogen supply sources 21 are joined.

The circulation passage 23 is connected to the gas/water discharge flow passage 25 via a gas-liquid separator 30 and a gas/water discharge valve 31. The gas-liquid separator 30 collects a water content from the hydrogen off gas. The gas/water discharge valve 31 operates in accordance with a command from the control part 7 to discharge (purge), from the system, the water content collected by the gas-liquid separator 30 and the hydrogen off gas (the fuel off gas) including impurities in the circulation passage 23. When the gas/water discharge valve 31 is opened, the concentration of the impurities in the hydrogen off gas of the circulation passage 23 lowers, and a hydrogen concentration in the hydrogen off gas to be circulated and supplied rises. An upstream pressure sensor 32 and a downstream pressure sensor 33 which detect the pressure of the hydrogen off gas are provided in an upstream position (on the circulation passage 23) and a downstream position (on the gas/water discharge flow passage 25) of the gas/water discharge valve 31, respectively. Information on the pressure of the hydrogen off gas detected by these pressure sensors is used in purge control described later. The circulation passage 23 is one embodiment of a discharge flow passage in the present invention, and the gas/water discharge valve 31 is one embodiment of a discharge valve in the present invention.

The hydrogen off gas discharged via the gas/water discharge valve 31 and the gas/water discharge flow passage 25 is diluted by a diluter (not shown) to join the oxidizing off gas in the gas discharge flow passage 12. The hydrogen pump 24 is driven by a motor (not shown) to circulate and supply the hydrogen gas of a circulation system to the fuel cell 2. The circulation system of the hydrogen gas is constituted of the passage on the downstream side of the joining part A1 of the hydrogen supply flow passage 22, a fuel gas passage formed in the separators of the fuel cell 2, and the circulation passage 23.

The refrigerant piping system 5 has a refrigerant passage 41 which communicates with a cooling passage in the fuel cell 2, a cooling pump 42 provided in the refrigerant passage 41, and a radiator 43 which cools the refrigerant discharged from the fuel cell 2. The cooling pump 42 is driven by a motor (not shown) to circulate and supply the refrigerant of the refrigerant passage 41 to the fuel cell 2.

The power system 6 includes a high-pressure DC/DC converter 61, a battery 62, a traction inverter 63, a traction motor 64, any type of auxiliary inverter (not shown) and the like. The high-pressure DC/DC converter 61 is a direct-current voltage converter, and has a function of adjusting a direct-current voltage input from the battery 62 to output the voltage to a traction inverter 63 side and a function of adjusting the direct-current voltage input from the fuel cell 2 or the traction motor 64 to output the voltage to the battery 62. The charging/discharging of the battery 62 is realized by these functions of the high-pressure DC/DC converter 61. Moreover, the output voltage of the fuel cell 2 is controlled by the high-pressure DC/DC converter 61.

The battery 62 is constituted by laminating battery cells, has a predetermined high voltage as a terminal voltage, and can be controlled by a battery computer (not shown) to charge a surplus power or auxiliary supply a power. The traction inverter 63 converts a direct current into a three-phase alternate current to supply the current to the traction motor 64. The traction motor 64 is, for example, a three-phase alternate current motor, and constitutes the main power source of a vehicle on which the fuel cell system 1 is mounted. The auxiliary inverter is a motor control section which controls the driving of each motor, and converts the direct current into the three-phase alternate current to supply the current to each motor. The auxiliary inverter is, for example, the PWM inverter of a pulse width modulation system, and converts the direct current voltage output from the fuel cell 2 or the battery 62 into the three-phase alternate current voltage in accordance with a control instruction from the control part 7 to control a rotary torque generated in each motor.

The control part 7 detects the operation amount of an acceleration operating member (an accelerator or the like) provided in the vehicle, and receives control information such as a demanded acceleration value (e.g., the demanded power generation amount from a load device such as the traction motor 64) to control the operations of various units in the system. It is to be noted that the load device is a generic power consumption device including, in addition to the traction motor 64, an auxiliary device (e.g., the motor of the compressor 14, the hydrogen pump 24, the cooling pump 42 or the like) required for operating the fuel cell 2, an actuator for use in any type of device (a change gear, a wheel control section, a steering device, a suspension device or the like) associated with the running of the vehicle, an air conditioning device (an air conditioner) of a passenger space, illumination, audio or the like.

The control part 7 is constituted of a computer system (not shown). Such a computer system includes a CPU, an ROM, an RAM, an HDD, an input/output interface, a display and the like, and the CPU reads any type of control program recorded in the ROM to execute desired calculation, to perform various processing and control such as purge control described later.

Figure 2:
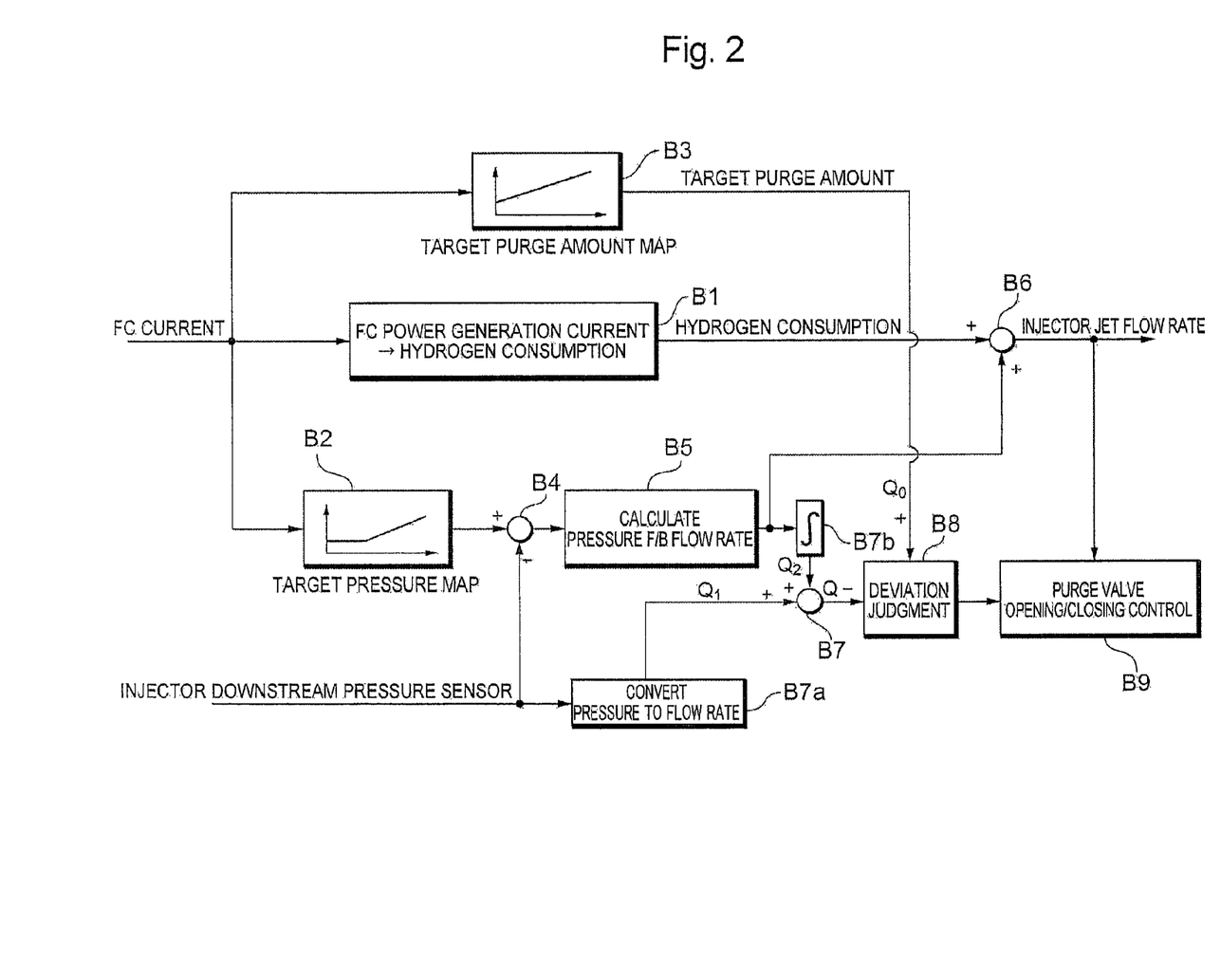
FIG. 2 is a control block diagram for explaining a control configuration of a control part of the fuel cell system shown in FIG. 1.

Specifically, as shown in FIG. 2, the control part 7 calculates the flow rate (hereinafter referred to as the "hydrogen consumption") of the hydrogen gas consumed by the fuel cell 2 based on the current value during the power generation of the fuel cell 2 detected by the current sensor 2a (a fuel consumption calculating function: B1). In the present embodiment, the hydrogen consumption is calculated and updated for each calculation period of the control part 7 by use of a specific calculation formula indicating a relation between the power generation current value and the hydrogen consumption.

Moreover, the control part 7 calculates a target pressure value of the hydrogen gas to be supplied to the fuel cell 2 in the downstream position of the injector 28 based on the power generation current value of the fuel cell 2 (a target pressure value calculating function: B2), and the control part 7 calculates a target purge amount (the target discharge amount of the hydrogen off gas from the gas/water discharge valve 31) (a target purge amount calculating function: B3). In the present embodiment, the target pressure value and the target purge amount are calculated for each calculation period of the control part 7 by use of a specific map indicating a relation between the power generation current value and the target pressure value and target purge amount.

Furthermore, the control part 7 calculates a difference between the calculated target pressure value and the pressure value (the detected pressure value) of the downstream position of the injector 28 detected by the pressure sensor 29 (a pressure difference calculating function: B4). Then, the control section 7 calculates a hydrogen gas flow rate (a feedback correction flow rate) to be added to the hydrogen consumption to reduce the calculated difference (a correction flow rate calculating function: B5). Moreover, the control part 7 adds up the hydrogen consumption and the feedback correction flow rate to calculate the jet flow rate of the injector 28 (a jet flow rate calculating function: B6). Then, the control part 7 calculates the jet time of the injector 28 based on the calculated jet flow rate and a driving period, and outputs a control signal for realizing this jet time, whereby the gas jet time and the gas jet timing of the injector 28 are controlled to adjust the flow rate and pressure of the hydrogen gas to be supplied to the fuel cell 2. It is to be noted that information on the calculated jet flow rate of the injector 28 is used in the purge control described later.

In addition, the control part 7 performs the feedback control of the injector 28 (controls the gas jet time and the gas jet timing of the injector 28 so that the detected pressure value in the downstream position of the injector 28 follows a predetermined target pressure value), and the control part 7 also performs the opening/closing control of the gas/water discharge valve 31, to discharge the water content and the hydrogen off gas in the circulation passage 23 to the exterior via the gas/water discharge valve 31.

In this case, the control part 7 calculates the total discharge amount (the purge amount) of the hydrogen off gas from the gas/water discharge valve 31 based on the change of a gas supply state from the injector 28 (a purge amount calculating function: B7) to judge whether or not the calculated purge amount is a predetermined target purge amount or more (a purge amount deviation judgment function: B8). Then, the control section 7 opens the gas/water discharge valve 31 in a case where a calculated purge amount Q is less than a target purge amount $Q_0$, and closes the gas/water discharge valve 31 in a case where the calculated purge amount Q is the target purge amount $Q_0$ or more (a purge control function: B9). During the purge control, in a case where the purge amount Q calculated at the start of the gas supply from the injector 28 is the target purge amount $Q_0$ or more at a certain time, the control part 7 continues the opening of the gas/water discharge valve 31 until the gas supply is stopped, and the control part 7 closes the gas/water discharge valve 31 simultaneously with the stop of the gas supply. That is, the control part 7 functions as control means in the present invention.

Here, the purge amount calculating function B7 of the control part 7 will be described in detail. In a case where the gas/water discharge valve 31 is opened to discharge the hydrogen off gas from the circulation passage 23 in a state in which the detected pressure value of the pressure sensor 29 in the downstream position of the injector 28 follows the target pressure value owing to the feedback control of the injector 28, the detected pressure value temporarily lowers. The control part 7 calculates such a pressure decrease due to the discharging (purging) of the hydrogen off gas, and calculates the discharge amount (the flow rate corresponding to the pressure change) of the hydrogen off gas corresponding to the pressure decrease based on this calculated pressure decrease (a pressure change corresponding flow rate calculating function: B7a). In the present embodiment, a pressure change corresponding flow rate $Q_1$ is calculated using a specific calculation formula indicating a relation between the pressure decrease due to the purging and the hydrogen gas discharge amount corresponding to this pressure decrease. Moreover, the control part 7 calculates the feedback correction flow rate (a gas correction supply flow rate) for compensating for the pressure decrease due to the discharging (purging) of the hydrogen off gas (the correction flow rate calculating function: B5), to calculate an integrated value $Q_2$ of this feedback correction flow rate with an elapse of time from a time when the purging is started (a correction flow rate integrating function: B7b). Then, the control part 7 adds up the pressure change corresponding flow rate $Q_1$ and the integrated value $Q_2$ of the feedback correction flow rate with the elapse of time from the time when the purging starts, to calculate the total discharge amount (the purge amount Q) of the hydrogen off gas from the gas/water discharge valve 31 (the purge amount calculating function: B7). That is, the control part 7 functions as discharge amount calculation means in the present invention.

Next, an operation method of the fuel cell system 1 according to the present embodiment will be described with reference to flow charts of FIGS. 3 and 4 and time charts of FIGS. 5A to 6C.

During the usual operation of the fuel cell system 1, the hydrogen gas is supplied from the hydrogen supply source 21 to the fuel pole of the fuel cell 2 via the hydrogen supply flow passage 22, and the humidified and adjusted air is supplied to the oxidizing pole of the fuel cell 2 via the air supply flow passage 11 to generate a power. In this case, the power (the demanded power) to be derived from the fuel cell 2 is calculated by the control part 7, and the amounts of the hydrogen gas and air are supplied into the fuel cell 2 in accordance with the amount of the power generated by the fuel cell. In the present embodiment, during such a usual operation, the feedback control of the injector 28 is performed. Moreover, the purge control of the gas/water discharge valve 31 (the opening/closing control of the gas/water discharge valve 31 for discharging, from the system, the water content and the hydrogen off gas accumulated in the circulation passage 23) is performed.

Figure 3:
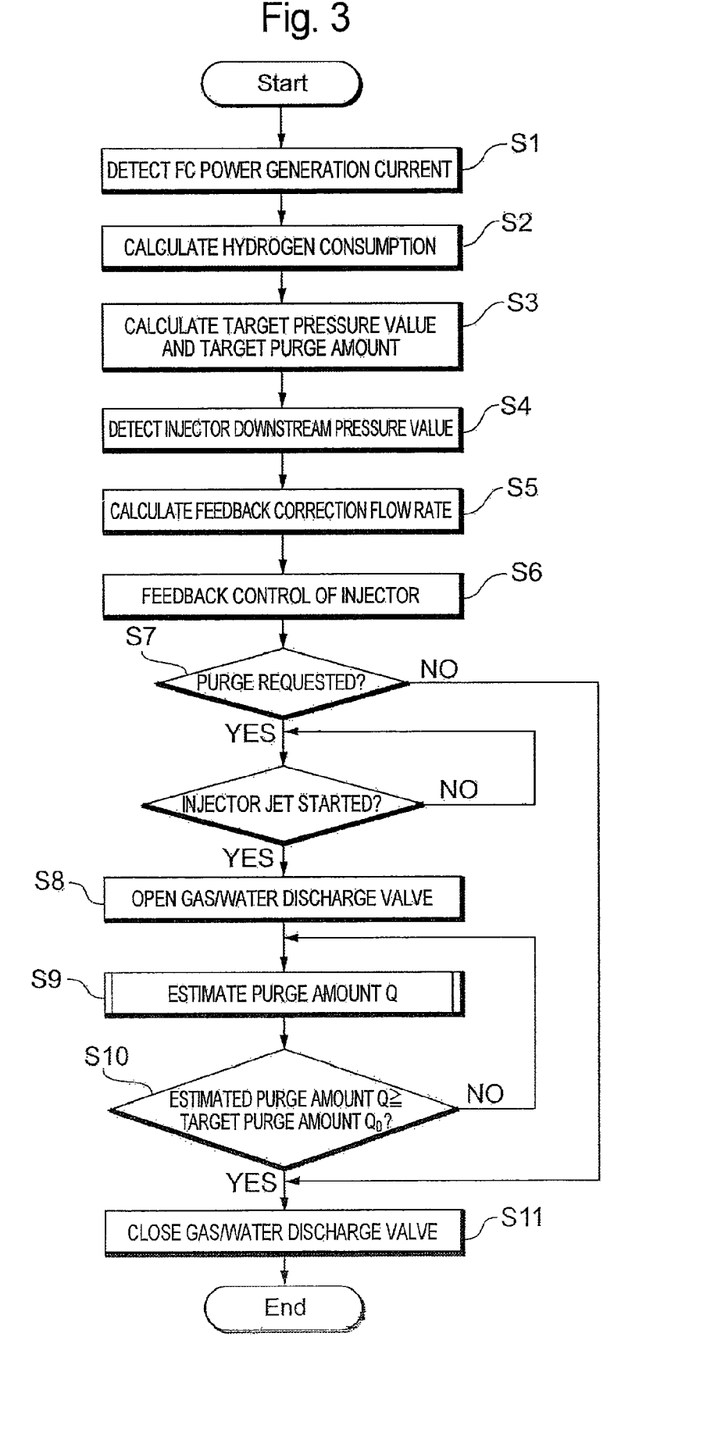
FIG. 3 is a flow chart for explaining an operation method of the fuel cell system shown in FIG. 1.
Figure 4:
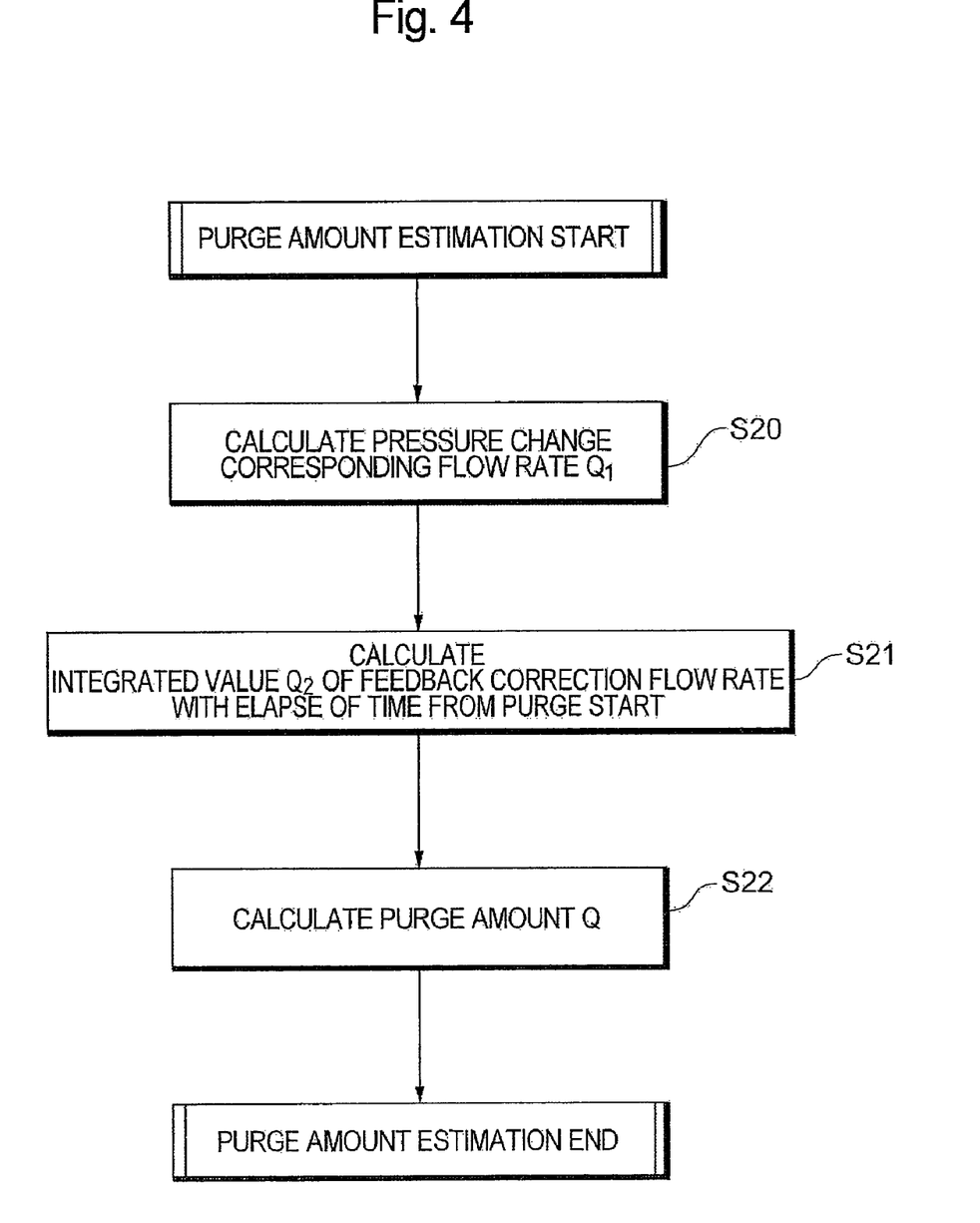
FIG. 4 is a flow chart for explaining a purge amount estimation step in the operation method of the fuel cell system shown in FIG. 1.

First, as shown in the flow chart of FIG. 3, the control part 7 of the fuel cell system 1 detects the current value during the power generation of the fuel cell 2 by use of the current sensor 2a (a current detection step: S1). Next, the control part 7 calculates the hydrogen consumption of the fuel cell 2 based on the detected current value (a hydrogen consumption calculation step: S2), and also calculates the target pressure value and the target purge amount of the hydrogen gas to be supplied to the fuel cell 2, in the downstream position of the injector 28 (a target value calculation step: S3).

Subsequently, the control part 7 detects the pressure value on the downstream side of the injector 28 by use of the pressure sensor 29 (a pressure value detection step: S4). Next, the control part 7 calculates the hydrogen gas flow rate (the feedback correction flow rate) to be added to the hydrogen consumption in order to decrease a difference between the target pressure value calculated in the target value calculation step S3 and the pressure value (the detected pressure value) detected in the pressure value detection step S4 (a correction flow rate calculation step: S5). Subsequently, the control part 7 adds up the hydrogen consumption and the feedback correction flow rate to calculate the jet flow rate of the injector 28, and calculates the jet time of the injector 28 based on this jet flow rate or a driving period. Then, the control part 7 outputs a control signal for realizing this jet time to control the gas jet time and the gas jet timing of the injector 28, and adjusts the flow rate and the pressure of the hydrogen gas to be supplied to the fuel cell 2 (a feedback control step: S6).

Figure 5A:
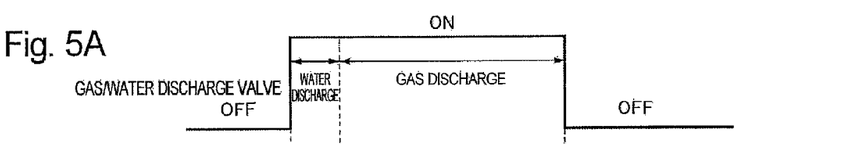
FIG. 5A is a time chart (showing the opening/closing operation of a gas/water discharge valve) for explaining the operation method of the fuel cell system shown in FIG. 1.
Figure 5B:
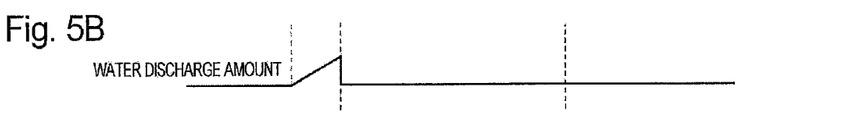
FIG. 5B is a time chart (showing the discharge amount of the gas/water discharge valve) for explaining the operation method of the fuel cell system shown in FIG. 1.
Figure 5C:
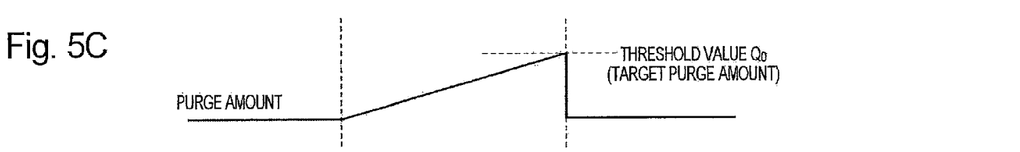
FIG. 5C is a time chart (showing the discharge amount (the purge amount) of the gas/water discharge valve) for explaining the operation method of the fuel cell system shown in FIG. 1.

The control part 7 judges whether or not there is a request for purge start while realizing the above feedback control step S6 (a purge request judgment step: S7). In the present embodiment, when the amount of the water content accumulated in a liquid reservoir portion of the gas-liquid separator 30 exceeds a predetermined threshold value, a liquid amount sensor (not shown) outputs a purge start request signal to the control part 7. In a case where it is judged that there is not any request for the purge start in the purge request judgment step S7, the control part 7 maintains the closed state of the gas/water discharge valve 31 (a purge valve closing step: S11). On the other hand, in a case where the control part 7 receives the purge start request signal to judge that there is the request for the purge start in the purge request judgment step S7 and the jetting of the gas from the injector 28 is already started, the control part 7 opens the gas/water discharge valve 31 (a purge valve opening step: S8). As shown in FIGS. 5A to 5C, when the gas/water discharge valve 31 is opened in the purge valve opening step S8, the water content accumulated in the gas-liquid separator 30 is discharged to the gas/water discharge flow passage 25. Substantially simultaneously with the end of the discharging of the water content, the hydrogen off gas in the circulation passage 23 is discharged to the gas/water discharge flow passage 25.

Moreover, simultaneously with the opening of the gas/water discharge valve 31, the control part 7 estimates the total discharge amount (the purge amount Q) of the hydrogen off gas from the gas/water discharge valve 31 (a purge amount estimation step: S9). Here, the purge amount estimation step S9 will be described with reference to the flow chart of FIG. 4, the time chart of FIG. 5D and the like.

Figure 5D:
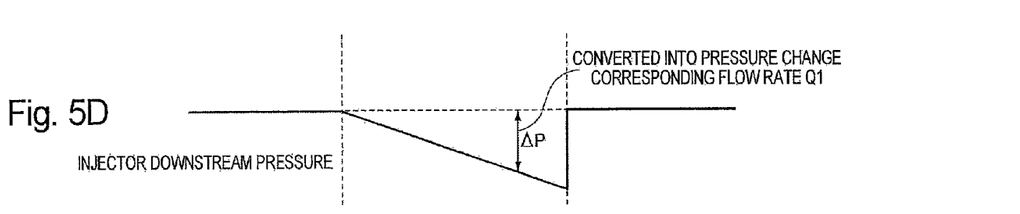
FIG. 5D is a time chart (showing the decrease of an injector downstream pressure due to purge) for explaining the operation method of the fuel cell system shown in FIG. 1.
Figure 5E:
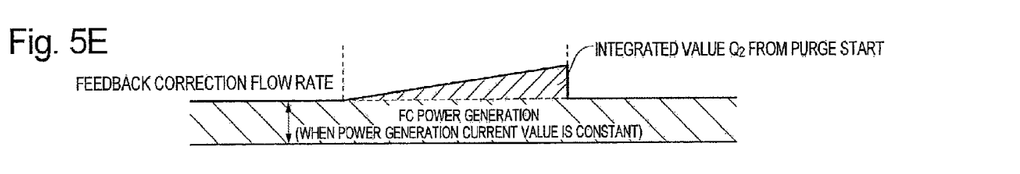
FIG. 5E is a time chart (showing a feedback correction flow rate for compensating for the decrease of the injector downstream pressure) for explaining the operation method of the fuel cell system shown in FIG. 1.

First, the control part 7 calculates the pressure change corresponding flow rate $Q_1$ as the flow rate corresponding to a pressure decrease $\Delta P$ based on the pressure decrease $\Delta P$ (a value obtained by subtracting the present hydrogen pressure from the reference hydrogen pressure: see FIG. 5D) of the downstream side of the injector 28 caused in a case where the gas/water discharge valve 31 is opened to discharge the hydrogen off gas (a pressure change corresponding flow rate calculation step: S20). Subsequently, the control part 7 calculates the feedback correction flow rate for compensating for the pressure decrease on the downstream side of the injector 28 caused in a case where the gas/water discharge valve 31 is opened to discharge the hydrogen off gas, and calculates the integrated value $Q_2$ (see FIG. 5E) of this feedback correction flow rate with an elapse of time from the purge start (a correction flow rate integration step: S21). Subsequently, the control part 7 adds up the pressure change corresponding flow rate $Q_1$ and the integrated value $Q_2$ of the feedback correction flow rate with the elapse of time from the purge start to calculate the total discharge amount (the purge amount Q) of the hydrogen off gas from the gas/water discharge valve 31 (a purge amount calculation step: S22).

Figure 6A:
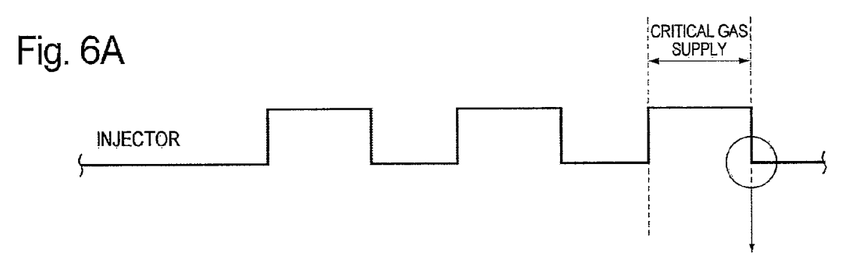
FIG. 6A is a time chart (showing the opening/closing operation of an injector) for explaining the purge control of the fuel cell system shown in FIG. 1.
Figure 6B:
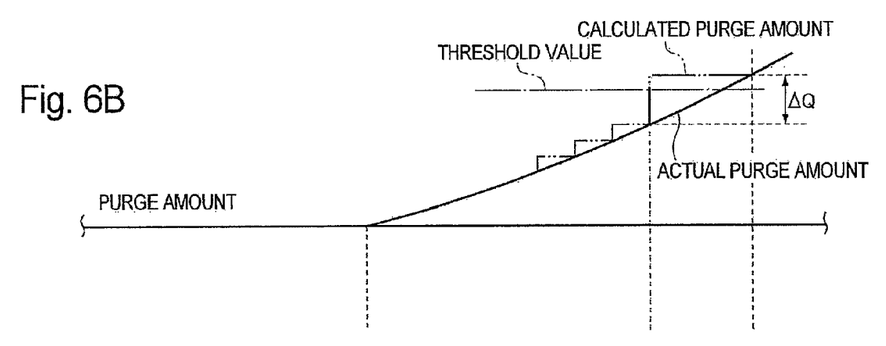
FIG. 6B is a time chart (showing a calculated purge amount and an actual purge amount) for explaining the purge control of the fuel cell system shown in FIG. 1.
Figure 6C:
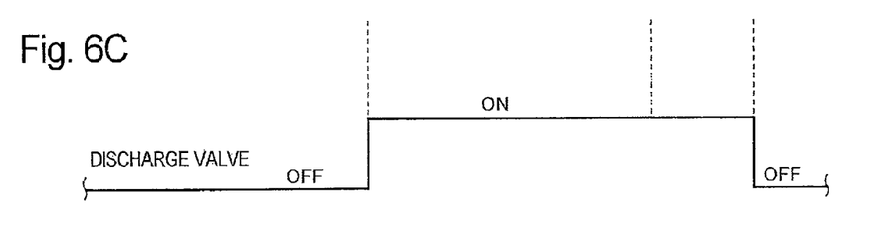
FIG. 6C is a time chart (showing the opening/closing operation of the gas/water discharge valve) for explaining the purge control of the fuel cell system shown in FIG. 1.

After the purge amount estimation step S9, the control part 7 judges whether the estimated total discharge amount (the purge amount Q) of the hydrogen off gas is the target purge amount $Q_0$ calculated in the target value calculation step S3 or more (a purge amount judgment step: S10). Then, in a case where the estimated purge amount Q is less than the target purge amount $Q_0$, the control part 7 continues the purge amount estimation step S9 and the purge amount judgment step S10. On the other hand, in a case where the estimated purge amount Q is the target purge amount $Q_0$ or more, the control part 7 closes the gas/water discharge valve 31 (the purge valve closing step: S11). In the purge valve closing step S11, as shown in FIGS. 6A and 6C, the control part 7 continues the opening of the gas/water discharge valve 31 until the gas supply is stopped in a case where the purge amount Q calculated at the start of the gas supply from the injector 28 is the target purge amount $Q_0$ or more at a certain time, and the control part 7 closes the gas/water discharge valve 31 simultaneously with the stop of the gas supply. The control part 7 can control the gas/water discharge valve 31 in this manner to discharge the gas of a gas discharge amount increment $\Delta Q$ corresponding to the gas supply (the critical gas supply) from the injector 28 in a case where the actual purge amount exceeds the target purge amount $Q_0$.

In the fuel cell system 1 according to the embodiment described above, in a case where the purge amount calculated while the gas/water discharge valve 31 is opened exceeds the predetermined target purge amount, the gas/water discharge valve 31 can be closed simultaneously with the stop of the critical gas supply from the injector 28. In other words, in a case where the purge amount calculated while the gas/water discharge valve 31 is opened exceeds the predetermined target purge amount, the opening of the gas/water discharge valve 31 can be continued in consideration of the critical gas supply from the injector 28. Therefore, the actual purge amount can be prevented from being below the target purge amount owing to the gas supply from the injector 28 (the gas discharge error).

Figure 7:
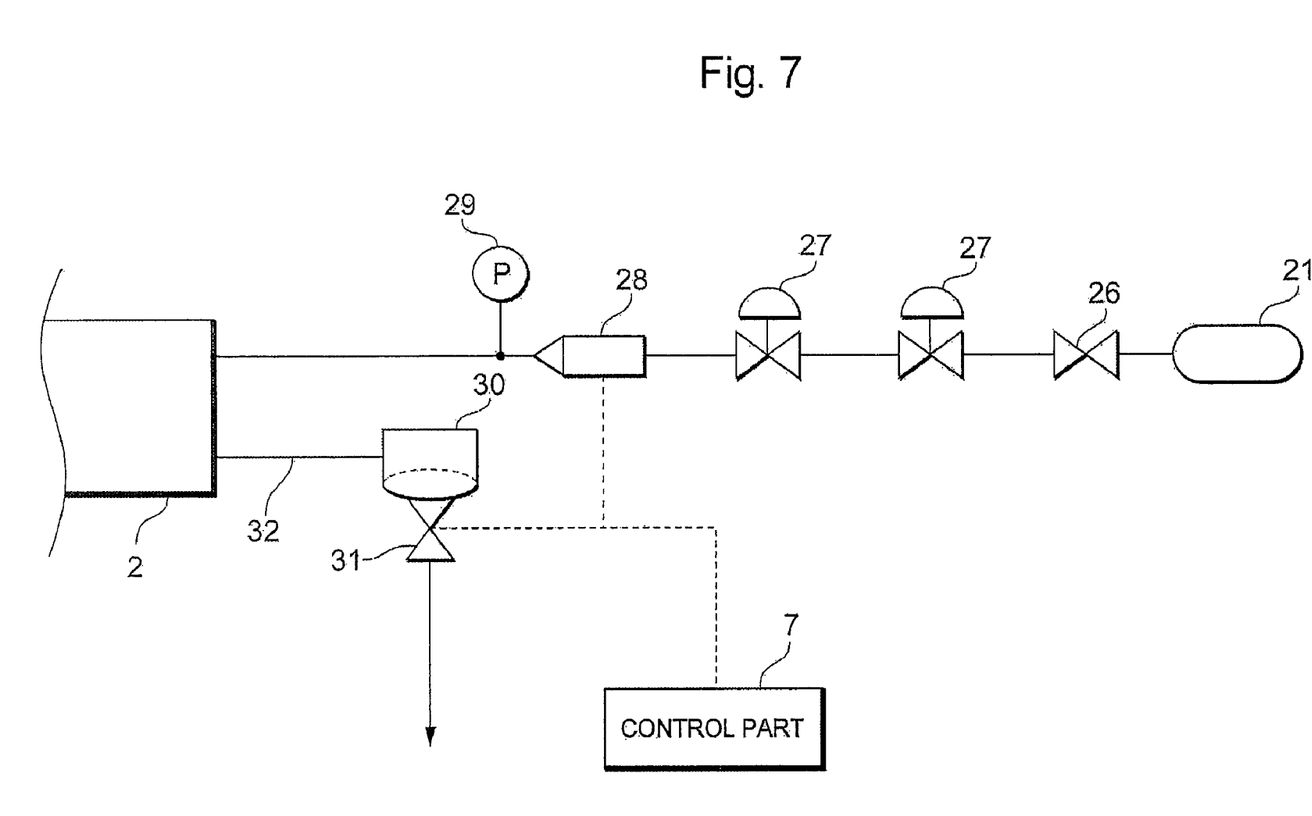
FIG. 7 is a constitution diagram showing a modification of the fuel cell system shown in FIG. 1.

It is to be noted that in the above embodiment, an example in which the hydrogen gas piping system 4 of the fuel cell system 1 is provided with the circulation passage 23 has been described. However, as shown in, for example, FIG. 7, a discharge flow passage 32 may be connected to a fuel cell 2 to omit the circulation passage 23. Even in a case where such a constitution (a dead end system) is employed, when a gas/water discharge valve 31 is closed simultaneously with the stop of critical gas supply from an injector 28 in the same manner as in the above embodiment, a function and an effect similar to those of the above embodiment can be obtained.

Moreover, in the above embodiment, an example has been described in which when the purge amount calculated while the gas/water discharge valve 31 is opened exceeds the target purge amount, the gas/water discharge valve 31 is closed simultaneously with the stop of the critical gas supply from the injector 28. However, the opening/closing operation of the gas/water discharge valve 31 can further precisely be controlled.

Figure 8A:
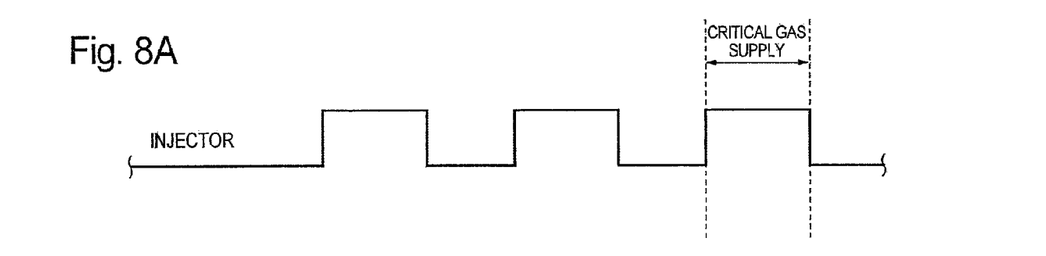
FIG. 8A is a time chart (showing the opening/closing operation of the injector) for explaining another example of the purge control of the fuel cell system shown in FIG. 1.
Figure 8B:
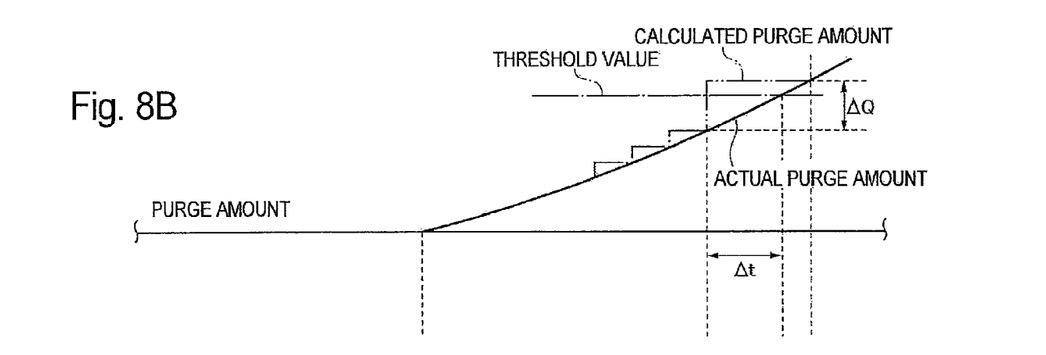
FIG. 8B is a time chart (showing the calculated purge amount and the actual purge amount) for explaining another example of the purge control of the fuel cell system shown in FIG. 1.
Figure 8C:
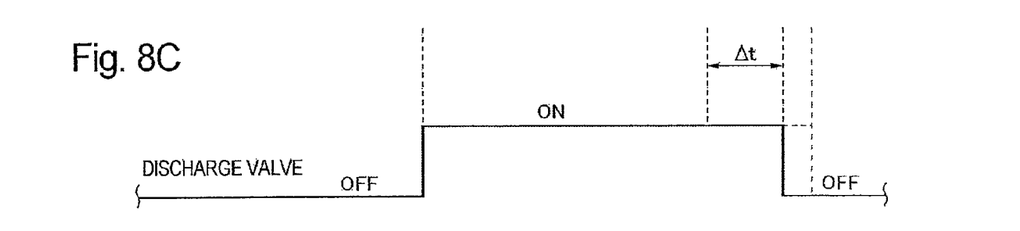
FIG. 8C is a time chart (showing the opening/closing operation of the gas/water discharge valve) for explaining another example of the purge control of the fuel cell system shown in FIG. 1.

As shown in, for example, FIGS. 8A to 8C, the control part 7 calculates a required time $\Delta t$ from a time when the critical gas supply from the injector 28 is started to a time when the purge amount calculated by adding a part of a gas discharge amount increment $\Delta Q$ corresponding to the critical gas supply to a purged amount at that time reaches the target discharge amount $Q_0$, in a case where the calculated purge amount Q is the target purge amount $Q_0$ or more, and the gas/water discharge valve 31 can be closed after the elapse of the required time $\Delta t$ from the start of the critical gas supply. The required time $\Delta t$ can be calculated using a local gas discharge speed (the gas discharge amount increment per unit time) calculated from the gas discharge amount increment $\Delta Q$ corresponding to the critical gas supply from the injector 28 and a time required for purging all of the gas discharge amount increment ΔQ, and a difference between the purge amount calculated before adding the gas discharge amount increment ΔQ and the target purge amount $Q_0$.

In a case where the control part 7 controls the gas/water discharge valve 31 in this manner, when the gas/water discharge valve 31 closes simultaneously with the stop of the critical gas supply from the injector 28 and the actual purge amount exceeds the target purge amount, as shown in FIG. 8C, the gas/water discharge valve 31 can be closed before the stop of the critical gas supply. Consequently, the actual purge amount can be prevented from being above the target purge amount (the gas discharge error).

Moreover, in the above embodiment, an example in which the circulation passage 23 is provided with the hydrogen pump 24 has been described, but an ejector may be employed instead of the hydrogen pump 24. Furthermore, in the above embodiment, an example in which the gas/water discharge valve 31 for realizing both the gas discharge and the water discharge is provided in the circulation passage 23 has been described. However, a water discharge valve for discharging the water content collected by the gas-liquid separator 30 to the exterior and a gas discharge valve for discharging the gas from the circulation passage 23 may separately be provided so that the control part 7 can separately control the water discharge valve and the gas discharge valve.

Furthermore, in the above embodiment, an example in which the hydrogen supply flow passage 22 is provided with the shut valve 26 and the regulator 27 has been described. However, since the injector 28 performs the function of the variable pressure adjustment valve and also performs the function of the shut valve for shutting the supply of the hydrogen gas, the shut valve 26 and the regulator 27 do not have to be necessarily provided. In consequence, when the injector 28 is employed, the shut valve 26 and the regulator 27 can be omitted, and hence the miniaturization and cost reduction of the system can be realized.

Additionally, in the above embodiment, an example in which the hydrogen consumption, the target pressure value and the target purge amount are set based on the power generation current value of the fuel cell 2 has been described. However, another physical amount (the power generation voltage value or power generation power value of the fuel cell 2, the temperature of the fuel cell 2 or the like) indicating the operation state of the fuel cell 2, and the hydrogen consumption, the target pressure value and the target purge amount may be set in accordance with the detected physical amount. Moreover, the control part may judge an operation state such as whether or not the fuel cell 2 is stopped, started to operate, operated just before entering an intermittent operation, operated immediately after recovering from the intermittent operation, or usually operated, and the control part may set the hydrogen consumption or the like in accordance with such an operation state.

INDUSTRIAL APPLICABILITY

As described above in the embodiment, a fuel cell system according to the present invention can be mounted on a fuel cell vehicle, and the system may be mounted on any type of mobile body (a robot, a ship, an airplane or the like) other than the fuel cell vehicle. Moreover, the fuel cell system according to the present invention may be applied to a stational power generation system for use as a power generation equipment for a construction (a housing, a building or the like).

The invention claimed is:
1. A fuel cell system, comprising:
a fuel cell;
a supply flow passage for flowing a fuel gas supplied from a fuel supply source to the fuel cell;
a variable gas supply device which regulates the state of the gas on an upstream side of the supply flow passage to supply the gas to a downstream side;
a discharge flow passage which flows a fuel off gas discharged from the fuel cell;
a discharge valve which discharges the gas from the discharge flow passage to an exterior; and
a control device configured to delay the timing of closing the discharge valve when the discharge amount of the gas exceeds a predetermined target discharge amount, the discharge amount of the gas being calculated while the discharge valve is opened and when the variable gas supply device starts to supply the gas,
the control device being configured to close the discharge valve simultaneously with the stop of the gas supply from the variable gas supply device, in a case where the discharge amount of the gas calculated while the discharge valve is opened and when the variable gas supply device starts to supply the gas exceeds the target discharge amount,
the gas supply being the supply of the fuel gas corresponding to a pressure decrease on the downstream side of the variable gas supply device due to the discharge of the gas from the discharge valve.
2. A fuel cell system, comprising:
a fuel cell;
a supply flow passage for flowing a fuel gas supplied from a fuel supply source to the fuel cell;
a variable gas supply device which regulates the state of the gas on an upstream side of this supply flow passage to supply the gas to a downstream side;
a discharge flow passage which flows a fuel off gas discharged from the fuel cell;
a discharge valve which discharges the gas from the discharge flow passage to an exterior; and
a control device configured to delay the timing of closing the discharge valve when the discharge amount of the gas exceeds a predetermined target discharge amount, the discharge amount of the gas being calculated while the discharge valve is opened and when the variable gas supply device starts to supply the gas,
the control device being configured to calculate a required time from a time when the gas supply from the variable gas supply device is started to a time when the discharge amount calculated by adding at least a part of a discharge amount increment corresponding to the gas supply to a discharged amount at that time reaches the target discharge amount, in a case where the discharge amount calculated while the discharge valve is opened and when the variable gas supply device starts to supply the gas exceeds the target discharge amount, and being configured to close the discharge valve after the elapse of the required time from the start of the gas supply.
3. The fuel cell system according to claim 2, wherein the control device has a discharge amount calculation device to calculate the discharge amount from the discharge valve based on the integration of the change of the gas supply state of the variable gas supply device with an elapse of time.
4. The fuel cell system according to claim 3, wherein the discharge amount calculation device adds up a pressure change corresponding flow rate converted from the change of the downstream pressure of the variable gas supply device, and the integrated value of a gas correction supply flow rate which compensates for the decrease of the downstream pressure of the variable gas supply device with the elapse of time, to calculate the discharge amount from the discharge valve.

5. The fuel cell system according to claim 1, wherein the variable gas supply device is an injector.

6. The fuel cell system according to claim 1, wherein the control device has a discharge amount calculation device to calculate the discharge amount from the discharge valve based on the integration of the change of the gas supply state of the variable gas supply device with an elapse of time.

7. The fuel cell system according to claim 6, wherein the discharge amount calculation device adds up a pressure change corresponding flow rate converted from the change of the downstream pressure of the variable gas supply device, and the integrated value of a gas correction supply flow rate which compensates for the decrease of the downstream pressure of the variable gas supply device with the elapse of time, to calculate the discharge amount from the discharge valve.

8. The fuel cell system according to claim 2, wherein the variable gas supply device is an injector.

* * * * *